(12) United States Patent
Dieter et al.

(10) Patent No.: US 10,894,556 B2
(45) Date of Patent: Jan. 19, 2021

(54) RIDING AND SLIDING SPORTS APPARATUS

(71) Applicants: David Wayne Dieter, San Diego, CA (US); Aymeric Ralph Henri Fraise, Shanghai (CN); Scott Christopher Stefan, Fort Pierce, FL (US); FlipSled International Limited, Wanchai (CN)

(72) Inventors: David Wayne Dieter, San Diego, CA (US); Aymeric Ralph Henri Fraise, Shanghai (CN); Scott Christopher Stefan, Fort Pierce, FL (US)

( * ) Notice: Subject to any disclaimer, the term of this patent is extended or adjusted under 35 U.S.C. 154(b) by 73 days.

(21) Appl. No.: 15/962,226

(22) PCT Filed: Sep. 5, 2016

(86) PCT No.: PCT/US2016/050329
§ 371 (c)(1),
(2) Date: Apr. 25, 2018

(87) PCT Pub. No.: WO2017/058467
PCT Pub. Date: Apr. 6, 2017

(65) Prior Publication Data
US 2019/0193770 A1    Jun. 27, 2019

Related U.S. Application Data

(60) Provisional application No. 62/234,063, filed on Sep. 29, 2015.

(51) Int. Cl.
*B62B 13/18* (2006.01)
*B62B 17/06* (2006.01)
*B62B 15/00* (2020.01)
*A63C 17/26* (2006.01)
*A63C 17/28* (2006.01)
(Continued)

(52) U.S. Cl.
CPC .......... *B62B 13/18* (2013.01); *A63C 17/0026* (2013.01); *A63C 17/04* (2013.01); *A63C 17/18* (2013.01); *A63C 17/265* (2013.01); *A63C 17/28* (2013.01); *B62B 15/008* (2013.01); *B62B 17/06* (2013.01); *B62B 17/061* (2013.01); *B62K 13/00* (2013.01); *A63C 2203/06* (2013.01); *B62K 17/00* (2013.01)

(58) Field of Classification Search
CPC ....... B62B 13/18; B62B 17/061; B62B 17/06; B62B 15/008; A63C 17/265; A63C 17/28; A63C 17/0026; A63C 17/18; A63C 17/04; A63C 2203/06; B62K 13/00; B62K 17/00
See application file for complete search history.

(56) References Cited

U.S. PATENT DOCUMENTS 2,063,627 A * 12/1936 Ruf .................. B62B 19/02
                                                280/8
3,273,908 A *  9/1966 Geiser, Jr. ............. B62B 3/00
                                                280/79.2
(Continued)

*Primary Examiner* — Erez Gurari
(74) *Attorney, Agent, or Firm* — Keeley DeAngelo LLP; W Scott Keeley

(57) ABSTRACT

In accordance with example embodiments of the present disclosure, the invention provides a sports apparatus having an upper surface and a lower surface, the upper surface designed to slide on slippery surfaces such as snow, ice or sand and the lower surface having wheels and thus designed to glide along smooth hard surfaces.

9 Claims, 10 Drawing Sheets

(51) Int. Cl.
    *A63C 17/00*     (2006.01)
    *A63C 17/18*     (2006.01)
    *A63C 17/04*     (2006.01)
    *B62K 13/00*     (2006.01)
    *B62K 17/00*     (2006.01)

(56) References Cited

U.S. PATENT DOCUMENTS

| | | | | |
|---|---|---|---|---|
| 3,591,193 | A | * | 7/1971 | Mitchell, Jr. ........... B62B 13/18 280/216 |
| 4,145,064 | A | * | 3/1979 | Carn ........................ B60B 9/00 280/266 |
| 5,106,109 | A | * | 4/1992 | Tattersall ................ B62B 13/18 152/9 |
| 5,125,687 | A | * | 6/1992 | Hwang .............. A63C 17/0033 188/217 |
| 6,276,700 | B1 | * | 8/2001 | Way ...................... B62B 15/008 280/267 |
| 6,926,293 | B1 | * | 8/2005 | Pope ...................... B62B 5/0083 280/19 |
| 8,091,906 | B1 | * | 1/2012 | Chen ....................... A63C 17/04 280/87.041 |
| D831,767 | S | * | 10/2018 | Fraise ........................... D21/760 |
| 2001/0028155 | A1 | * | 10/2001 | Way, II .................. A63C 17/28 280/87.01 |
| 2003/0141683 | A1 | * | 7/2003 | Pace ....................... B62B 13/06 280/18 |
| 2004/0113378 | A1 | * | 6/2004 | Way, II .................. B62B 15/008 280/7.12 |
| 2006/0082089 | A1 | * | 4/2006 | Rejtano ................... A63B 22/18 280/87.042 |
| 2007/0262546 | A1 | * | 11/2007 | Bertiller ................. A63C 17/01 280/87.042 |
| 2007/0296167 | A1 | * | 12/2007 | Beswick ............... B62B 15/008 280/47.34 |
| 2013/0277925 | A1 | * | 10/2013 | Bysiewicz .............. B62B 13/18 280/13 |
| 2019/0193770 | A1 | * | 6/2019 | Dieter ..................... B62B 13/18 |

* cited by examiner

RIDING AND SLIDING SPORTS APPARATUS

TECHNICAL FIELD

The present disclosure relates to sports apparatus and in particular wheeled-riding and friction-reducing sliding apparatus.

BACKGROUND

Sport and play apparatus are often condition specific. Skateboards, scooters, roller skates and other wheeled apparatus work best on smooth, dry pavement while sleds, skis, snowboards, ice skates and other sliding apparatus require a low friction material such as snow or ice although have been used or adapted for use over sand or water. Developments have included engineering and design modifications of an apparatus from one environment to provide function in another environment. Roller blades, inspired by ice skates, are an example of an apparatus developed for use in one environment that were re-designed to be used in another environment. Similarly, one skilled in the art, can understand that surf boards inspired skateboards, the skateboard inspired the snowboard, snow skis inspired water skis, and the like.

Apparatus intended of only one environment have little use in the opposing environment. Skis, sleds and snowboards have little use in summer environments. Some environments include both smooth pavement and ice and/or snow. For example when traveling from a car, through a parking lot, to a ski area one may encounter pavement and snow in the same experience.

Accordingly, there is a need for a sport apparatus that can function equally in two environments.

SUMMARY

The present embodiment relates to sliding and sledding, and to riding and rolling sport apparatus and toys.

The present embodiment is a combination sled and wheeled sports apparatus, providing equally functional properties in an environment with smooth pavement and in an environment with snow and/or ice.

A single platform may provide wheels on one side and a surface designed for sliding on snow or ice on the opposite side. A platform for sitting atop a set of wheels provides riding functionality over smooth, hard surfaces. The platform for sitting atop the set of wheels is also formed to provide at least two smooth linear rail forms such that when the apparatus is inverted, the rider may sit on the opposite side of the platform and slide over snow or ice.

Other objects and features will become apparent from the following detailed description considered in conjunction with the accompanying drawings. It is to be understood, however, that the drawings are designed as an illustration and not as a definition of the limits of the invention.

BRIEF DESCRIPTION OF THE DRAWINGS

To assist those of skill in the art in making and using the disclosed ride on toy, reference is made to the accompanying figures, wherein.

DESCRIPTION

Figure 1:
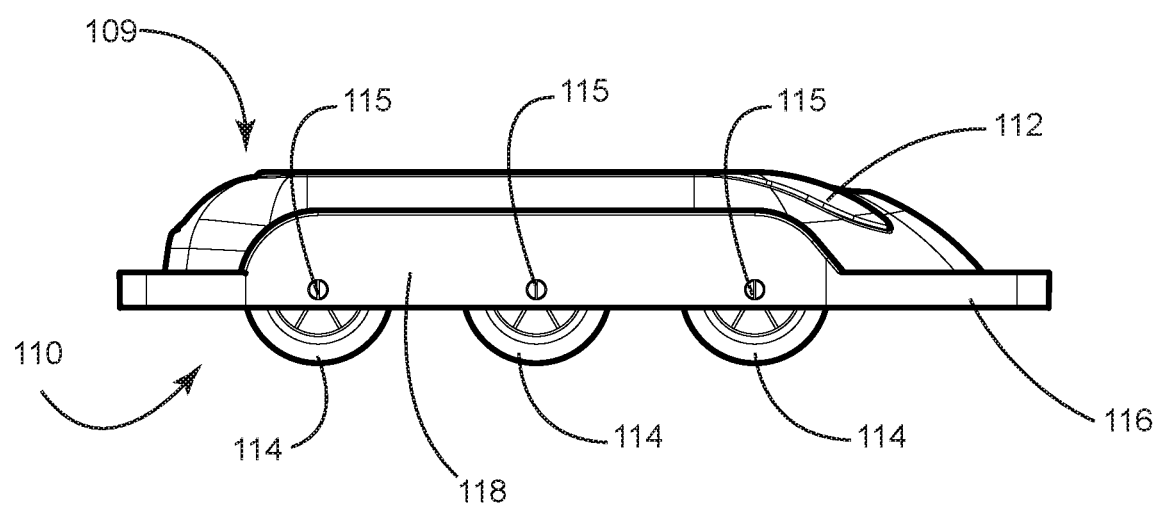
FIG. 1 is an orthographic side view of the embodiment oriented with a sliding side down and a wheeled side up.
Figure 2:
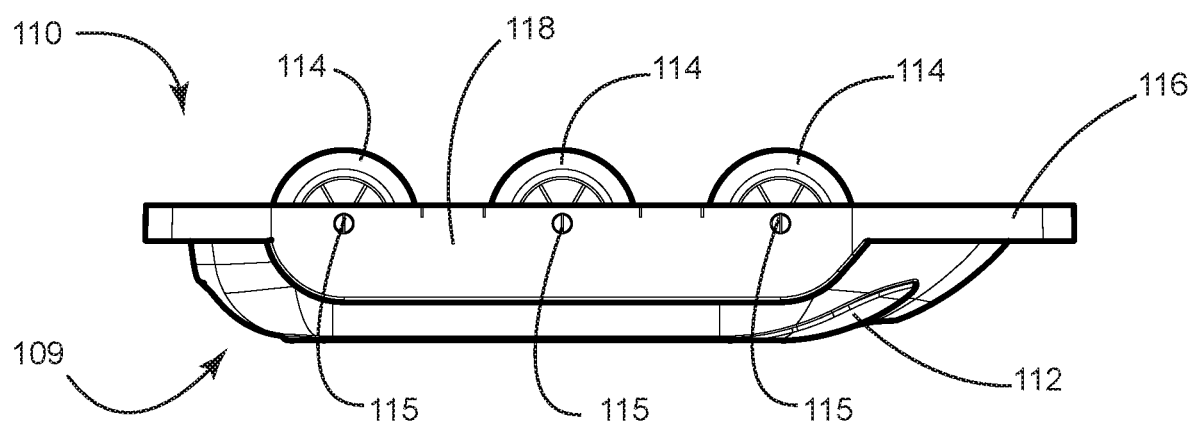
FIG. 2 is an orthographic side view of the embodiment oriented with a wheeled side down and a sliding side up.

Referring to FIGS. 1 and 2, in an example embodiment 100, a sports apparatus comprises an upper surface 109 and a lower surface 110. The same embodiment is shown in one orientation in FIG. 1 and in the opposite orientation in FIG. 2. In FIG. 1 the sports apparatus is oriented for rolling along hard surfaces and in FIG. 2 the sports apparatus is oriented for riding on slick surfaces such as snow, ice, or sand. The upper surface 109 is generally convex and is designed with molded linear protrusions 112 for sliding on slick surfaces. The lower surface 110 has mounting means 118 for wheels 114. The mounting means 118 has an interior portion for containing the wheels 114 and for providing a mounting structure for the wheel axels 115. The mounting means 118 also covers a portion of the wheels 114 so that when a rider is rolling on a hard surface with the wheels down, the riders hands are protected from the rotating wheels.

Figure 3:
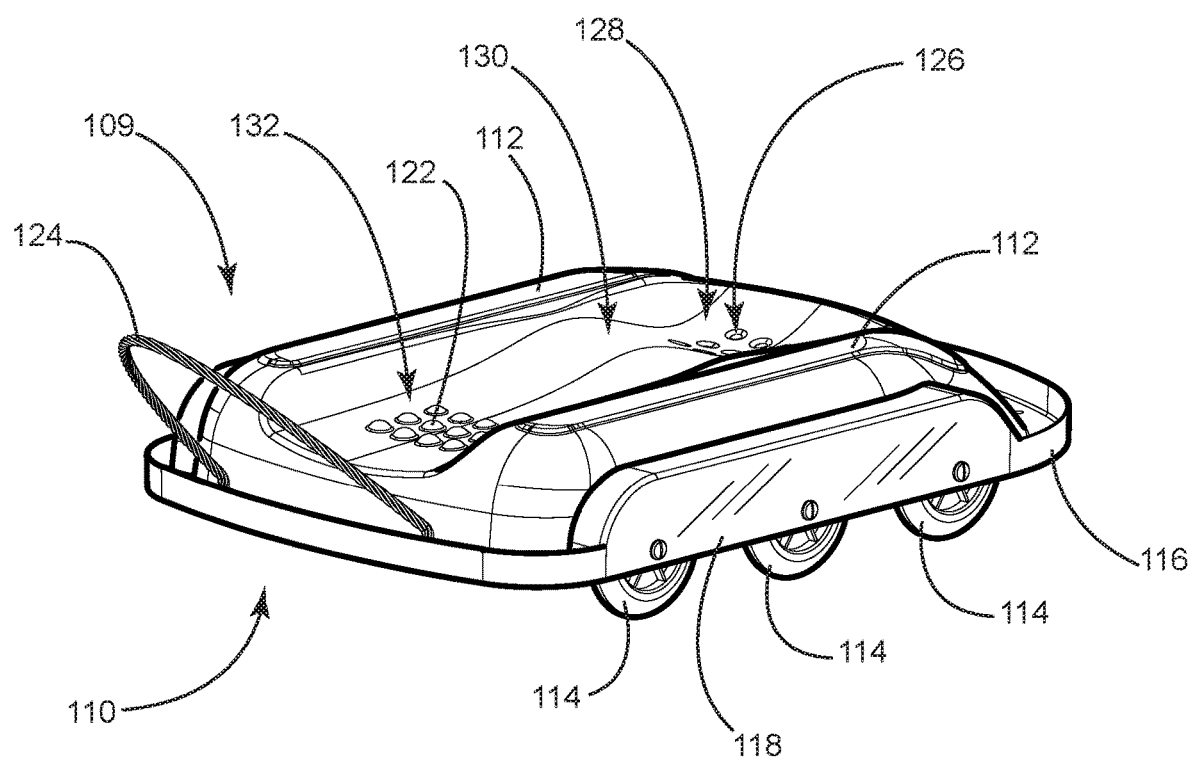
FIG. 3 is a perspective view of the embodiment oriented with a wheeled side down and a sliding side up.
Figure 4:
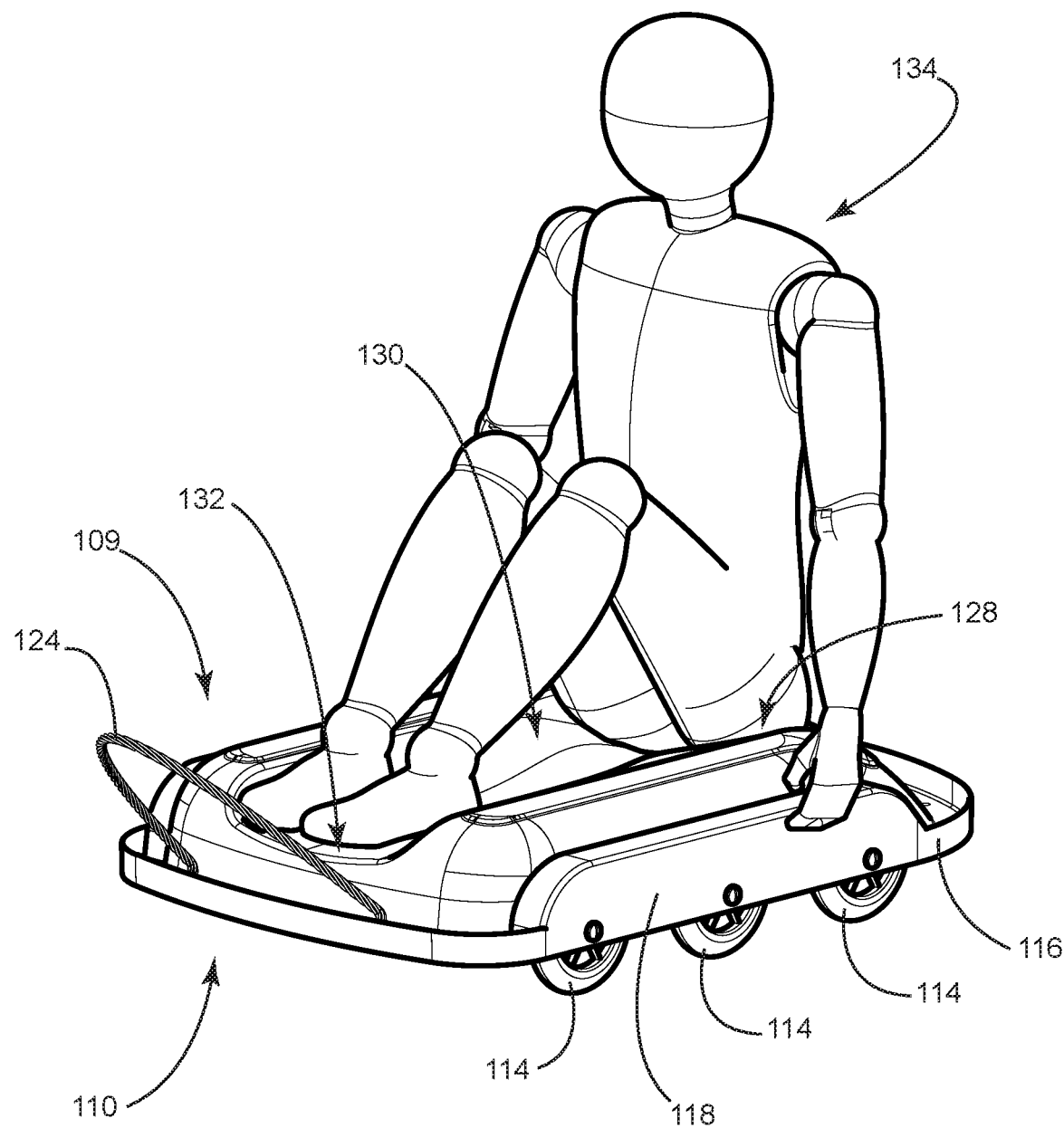
FIG. 4 is a perspective view of the embodiment oriented with a wheeled side down and a sliding side up wherein the sliding side provides a seat for the rider.

Referring to FIG. 3 and FIG. 4, the sports apparatus is shown with the lower surface 110 downward and so, with wheels 114 downward, for riding on hard surfaces. The upper surface 109 comprises a concave contour 128 that has divots 126 providing friction between the rider and the seat. The concave contour 128 transitions to a convex contour 130 that in turn transitions to a substantially flat contour 132. The flat contour 132 has a number of domed protrusions 122. The concave contour 128 provides an area for sitting and the divots provide texture to prevent sliding off the surface. The flat contour 132 provides a location to place ones feet and the domed protrusions 122 provide texture to prevent feet from sliding off the surface. FIG. 4 illustrates a rider 134 seated on the upper surface 109. Longitudinal protrusions 112 are designed for sliding over slick surfaces when in the opposite orientation and provide a side-wall to either side of the concave contour 128 and the flat contour 132 when in the orientation shown. The wheels 114 are mounted to mounting means 118 that also provides a cover for the wheels to prevent the rider's fingers from getting caught in the rotating wheels. A lip 116 surrounds the perimeter of the form to provide rigidity to the structure. A handle 124 is engaged with the lip 116 and provides either a handle for the rider or a means of pulling the sports apparatus along.

Figure 5:
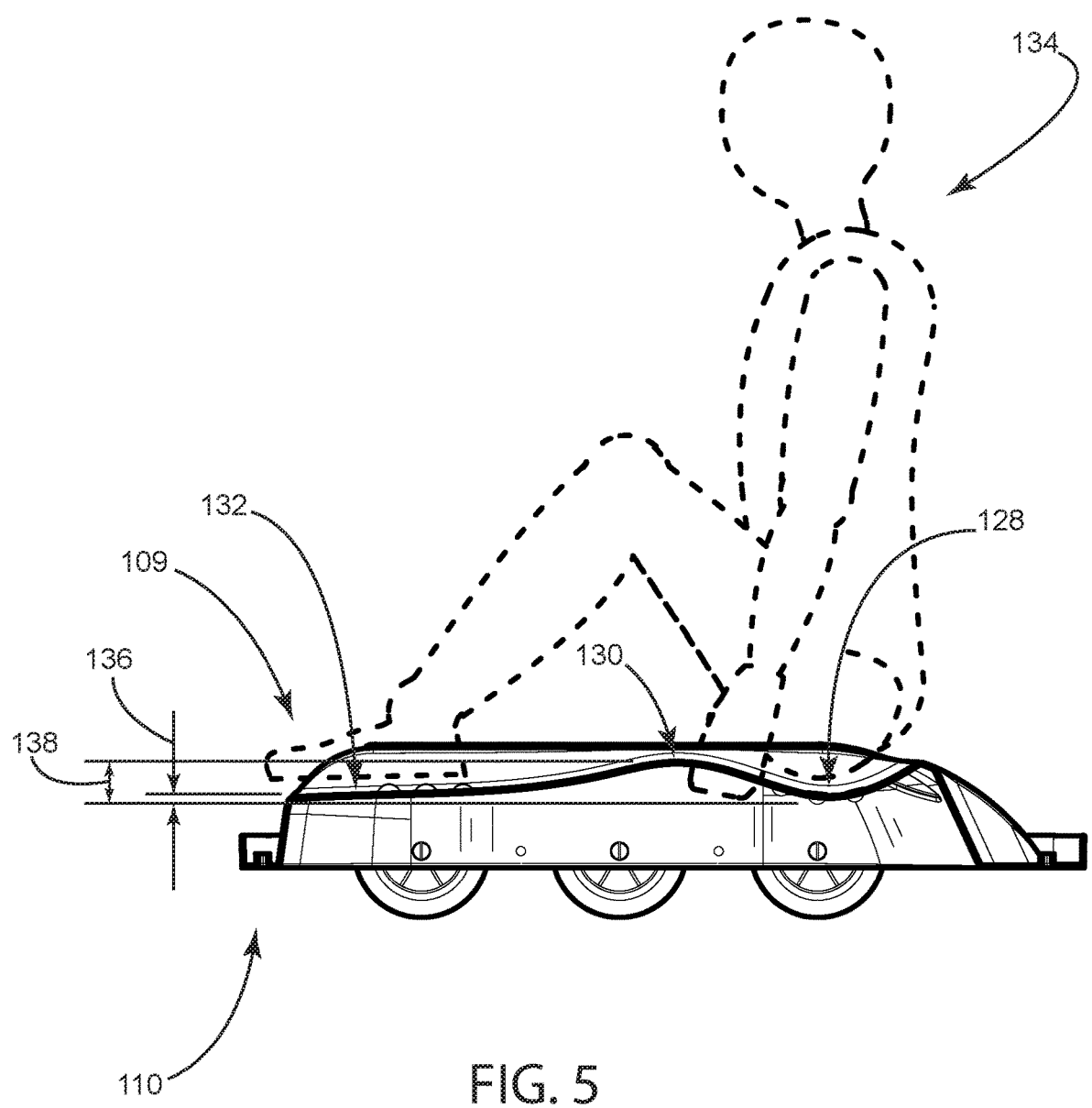
FIG. 5 is an orthographic, side, section view of the embodiment depicting the contour of the seat when the embodiment is oriented with wheels down using the sliding surface as a seat.

FIG. 5 is a cross section of the assembly shown in FIG. 4. The rider 134 is seated in the concave contour 128 and has feet placed on the flat contour 132. The convex contour 130 helps prevent the rider from sliding forward and transitions to the flat contour 132. The flat contour 132 is up to 2 inches higher than the bottom of the concave contour 128 and is between 2 inches and 4 inches below the convex contour 130.

Figure 6:
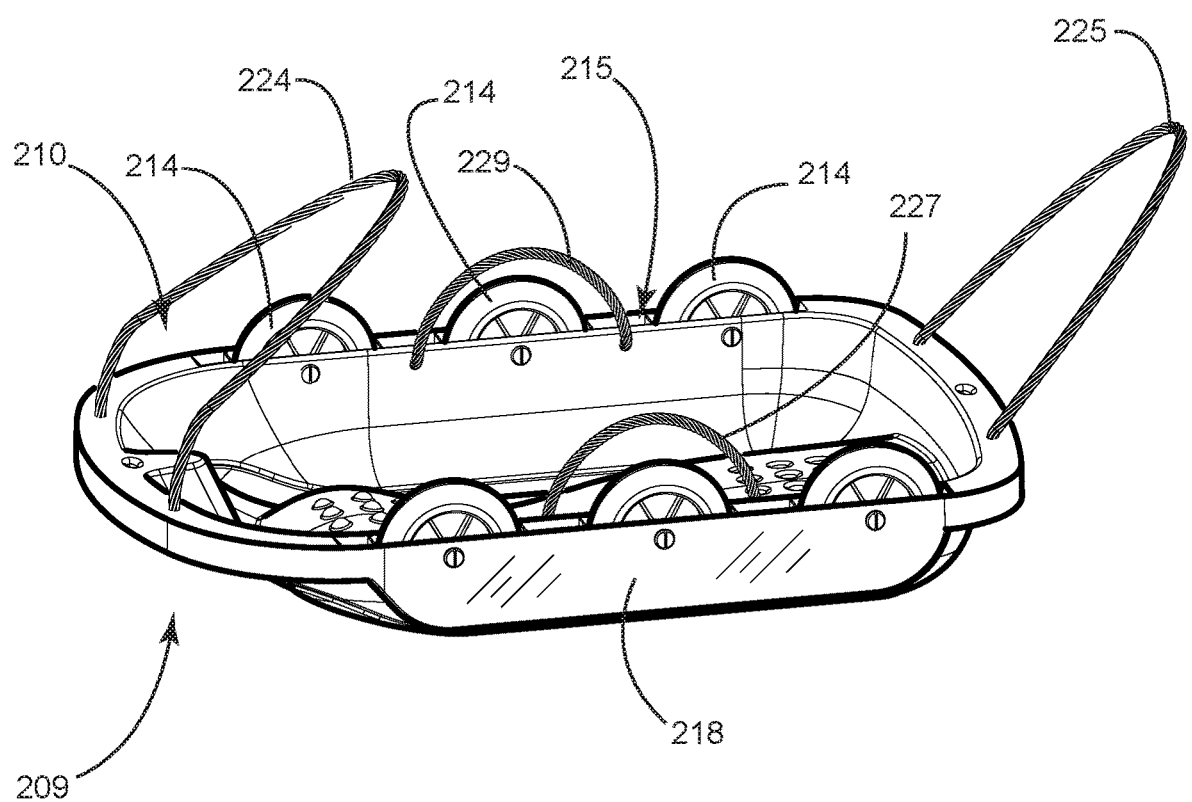
FIG. 6 is a perspective view of the embodiment oriented with a sliding side down and a wheeled side up depicting handles comprised of a flexible linear material.
Figure 7:
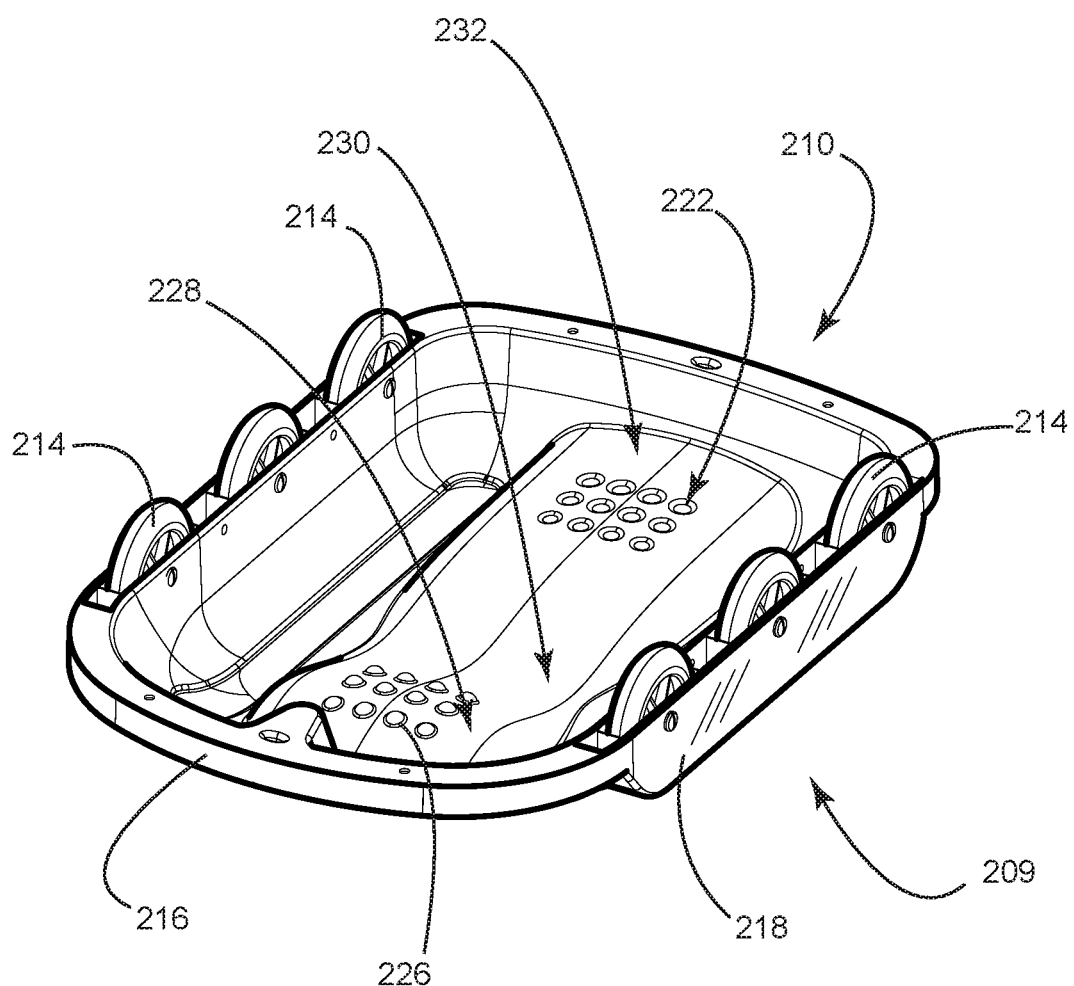
FIG. 7 is a perspective view of the embodiment oriented with a sliding side down and a wheeled side up, depicting the contour of the seat when the embodiment is oriented with wheels up and sliding side down.
Figure 8:
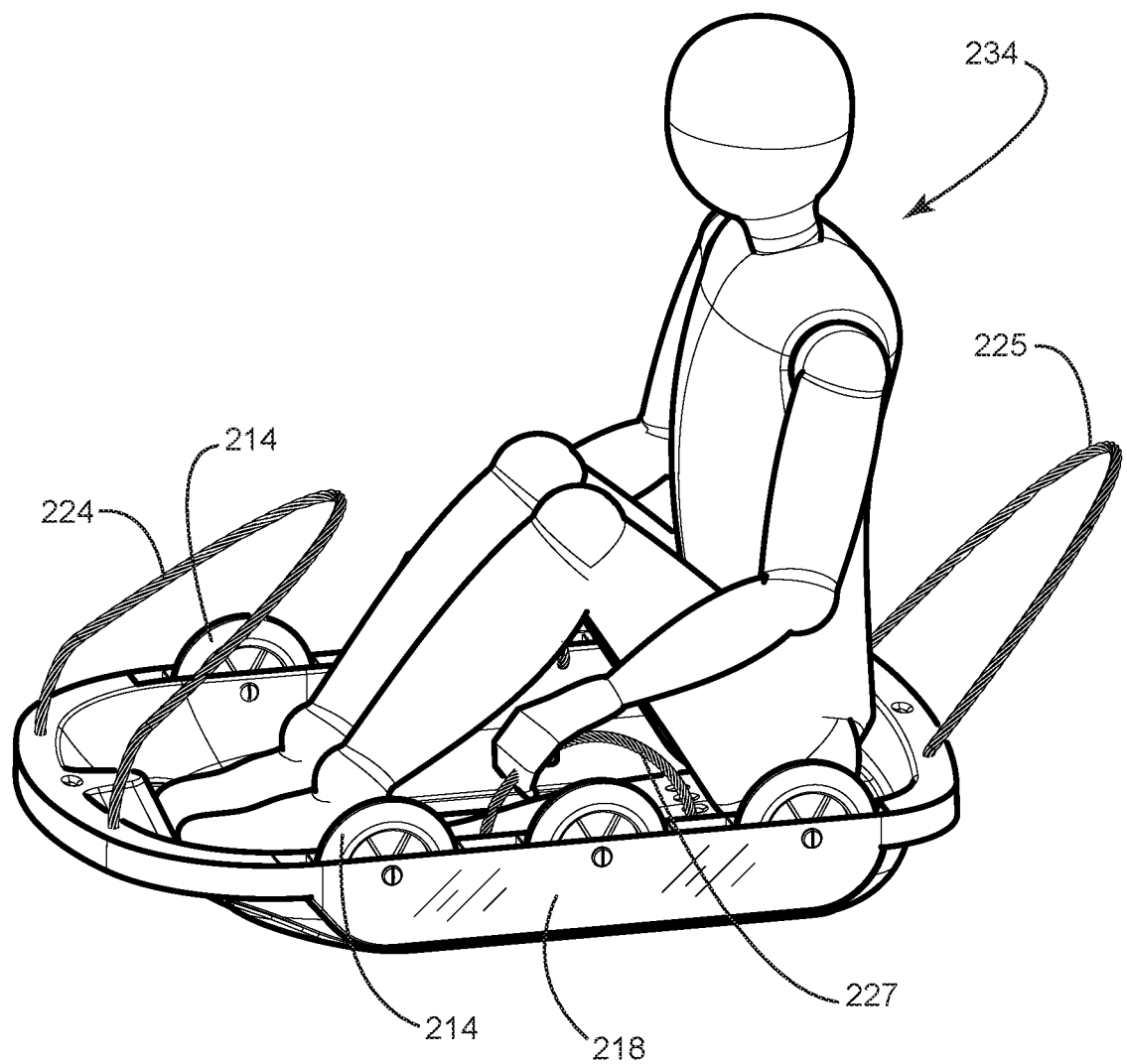
FIG. 8 is a perspective view of the embodiment depicting the embodiment oriented with the sliding side down, the rider using the interior surface as a seat.

Referring to FIG. 6, FIG. 7 and FIG. 8 the embodiment 200 is the identical structure to the preceding figures oriented with the wheels upward and the sliding surface downward. The convex surface 209 is designed for sliding over slick surfaces and is oriented downward. The concave surface 210 is oriented upwards and provides a contoured bottom for sitting in. Wheels 214 are engaged with mounting means 218 and are covered by mounting means 218 to prevent snow from damaging the wheels. Handles 227 and 229 provide a gripping means for the rider 234. Handle 224 may be used as a handle for the rider or may be used by an assistant pulling the rider. Handle 225 may also be used by an assistant to guide the apparatus. The bottom of the surface comprises a flat contour 232 having divots 222. The flat contour 232 transitions to a concave contour 230 that in turn transitions to a convex contour 228 which has domed protrusions 226.

Figure 9:
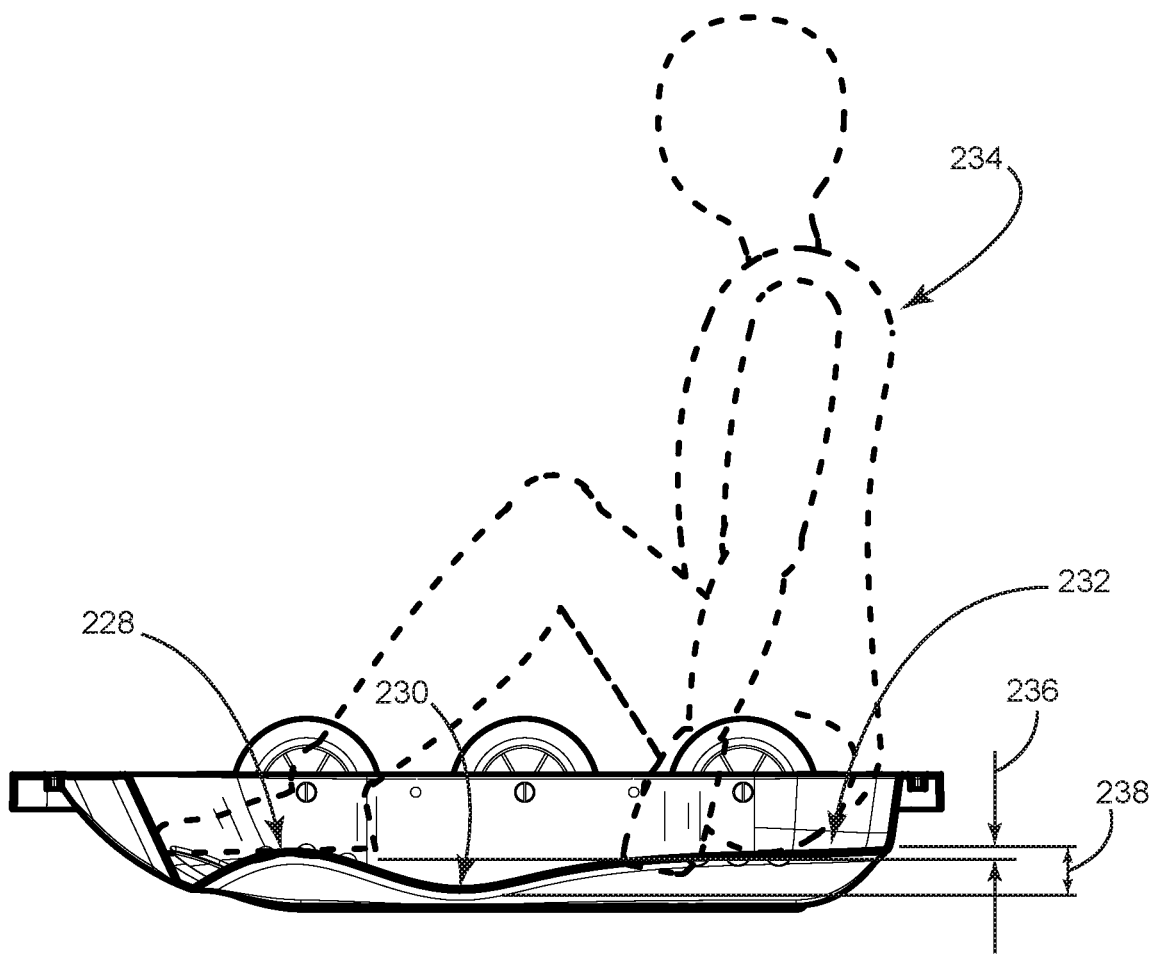
FIG. 9 is an orthographic, side, section view of the embodiment depicting the contour of the seat when the embodiment is oriented with the sliding side down, the rider using the interior surface as a seat.

FIG. 9 is a cross section of the apparatus 200 with rider 234 shown in dashed lines. The rider 234 is seated on the flat contour 232 and has feet placed on the convex contour 228. The flat contour transitions to a concave contour 230 that in turn transitions to the convex contour 228. The flat contour 228 is between 2 inches and 4 inches above the concave contour and the convex contour 228 is up to 2 inches below the flat contour.

Figure 10:
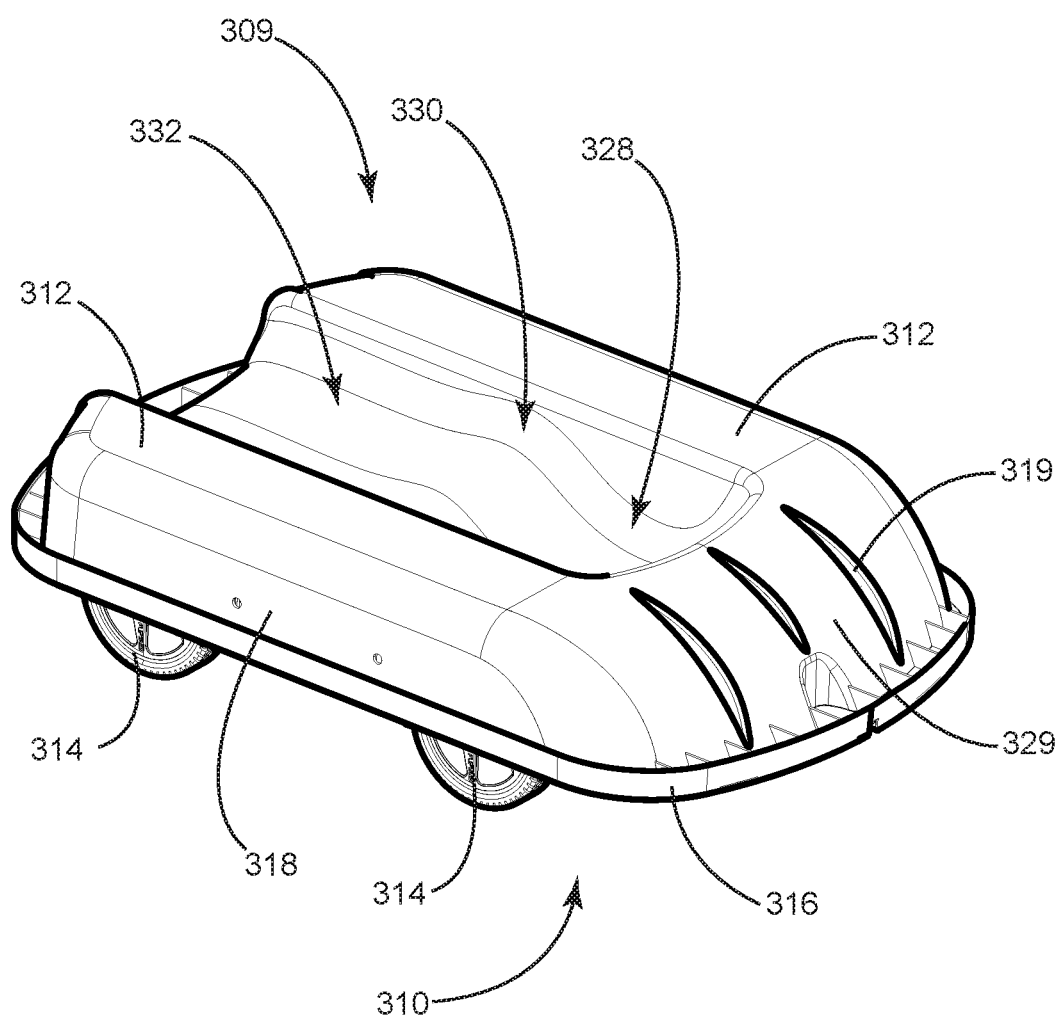

Referring to FIG. 10, an iteration of the embodiment is illustrated, the sports apparatus 300 is shown with the lower surface 310 downward and so, with wheels 314 downward, for riding on hard surfaces. The upper surface 309 comprises a concave contour 328. The concave contour 328 transitions to a convex contour 330 that in turn transitions to a substantially flat contour 332. The concave contour 328 provides an area for sitting. The flat contour 332 provides a location to place ones feet. Longitudinal protrusions 312 are designed for sliding over slick surfaces when in the opposite orientation and provide a side-wall to either side of the concave contour 328 and the flat contour 332 when in the orientation shown. The wheels 314 are mounted to mounting means 318 that also provides a cover for the wheels to prevent the rider's fingers from getting caught in the rotating wheels. A lip 316 surrounds the perimeter of the form to provide rigidity to the structure. Ridges 319 stiffen and strengthen the arcuate surface 329.

The present disclosure has been described with reference to exemplary embodiments. Obviously, modifications and alterations will occur to others upon reading and understanding the preceding detailed description. Details in one embodiment may be incorporated into other embodiments. One skilled in the art, for example, will understand that handles illustrated in the embodiment of FIG. 7 may be incorporated into the embodiment illustrated in FIG. 2 and so forth. It is intended that the present disclosure be construed as including all such modifications and alterations insofar as they come within the scope of the appended claims or the equivalents thereof.

The invention claimed is:

1. A sports apparatus for sliding and rolling along a surface comprising:

material of substantially uniform thickness providing a contiguous form having an upper surface, and a lower surface; and the upper surface having a convex shape resulting in the lower surface having a concave shape; and the contour of said upper surface comprises a substantially concave contour, transitioning to a convex contour that in turn transitions to a substantially flat contour in the substantially convex surface; and said concave contour for sitting on, and said flat contour for placing feet on; and said concave contour is above said flat contour; and said convex contour is above the flat contour; and said upper and lower surface transitioning arcuately to vertical side-walls extending away from said upper surface and surrounding said lower surface; and the sidewalls having mounting means for rotationally engaging the axels of at least two wheels; wherein a rider may sit upon the upper surface, thus positioning the at least two wheels downward for riding along a hard surface; and alternately, the rider may sit upon the lower surface thus positioning the convex surface downward for sliding along a slippery surface.

2. A sports apparatus for sliding and rolling along a surface comprising:

material of substantially uniform thickness providing a contiguous form having an upper surface, and a lower surface; and the upper surface having a convex shape resulting in the lower surface having a concave shape; and wherein said lower surface is a comprises a substantially flat contour that transitions into a concave contour that in turn transitions into a convex contour; and said flat contour is for sitting on, and said convex contour is for placing feet on and said convex contour is below said flat contour; and said concave contour is below said flat contour; and said upper and lower surface transitioning arcuately to vertical side-walls extending away from said upper surface and surrounding said lower surface; and the sidewalls having mounting means for rotationally engaging the axles of at least two wheels;

wherein a rider may sit upon the upper surface, thus positioning the at least two wheels downward for riding along a hard surface; and alternately, the rider may sit upon the lower surface thus positioning the convex surface downward for sliding along a slippery surface.

3. The sports apparatus of claim 2, wherein handles comprising flexible longitudinal cord are engaged with the convex surface.

4. The sports apparatus of claim 2, wherein handles comprising flexible longitudinal cord are engaged with said side-walls, wherein the rider may hold on to the handle or an assistant may hold on to a handle for guiding the sports apparatus.

5. The sports apparatus of claim 2, wherein said mounting means comprises a second vertical wall, forming a double-walled side-wall for engaging two ends of an axle for rotationally engaging said at least two wheels.

6. The sports apparatus of claim 5, wherein said double-walled side-wall covers between 40% and 70% of said wheels.

7. A sports apparatus for sliding and rolling along a surface comprising:

a substantially uniform thickness forming an upper horizontal surface, and a lower horizontal surface; and said upper and lower horizontal surface having a long axis and a short axis;

the long axis having a first end and a second end; and said upper horizontal surface and said lower horizontal surface transitioning arcuately to vertical side-walls; and a second vertical surface proximal to said vertical side-walls forming a double-walled side-wall; and said double-walled side-walls supporting at least two axles for mounting at least two wheels; and the opposite side of the upper horizontal surface is the lower horizontal surface; and said upper horizontal surface having a contour said contour comprising:

an arcuate transitional surface from said vertical side-wall proximal to said first end; and horizontal rails extending from said first end to said second end; and said horizontal rails parallel to said long axis and proximal to said double-walled side-walls; and a concave form transitioning from said arcuate transition from said vertical side-wall proximal to said first end; and said concave form residing between two said horizontal rails; and said concave form transitioning along said long axis to a convex form; and said convex form transitioning along said long axis to a horizontal planar form;

wherein, said upper horizontal surface provides a means for sitting atop the form with said wheels downward, said uniform thickness form also providing a means for sitting within the form when said two horizontal rails are downward.

8. The sports apparatus of claim 7 wherein:

said lower surface is a comprises a substantially flat contour that transitions into a concave contour that in turn transitions into a convex contour; and said flat contour is for sitting on, and said convex contour is for placing feet on and said convex contour is below said flat contour; and said concave contour is below said flat contour.

9. The sports apparatus of claim 7 wherein said arcuate transitional surface from said vertical side-wall proximal to said first end comprises ribs for stiffening and strengthening said arcuate transition surface.

* * * * *